Jan. 1, 1963 W. W. FENN 3,071,766
RADAR ALTITUDE CONTROL
Filed Aug. 27, 1958
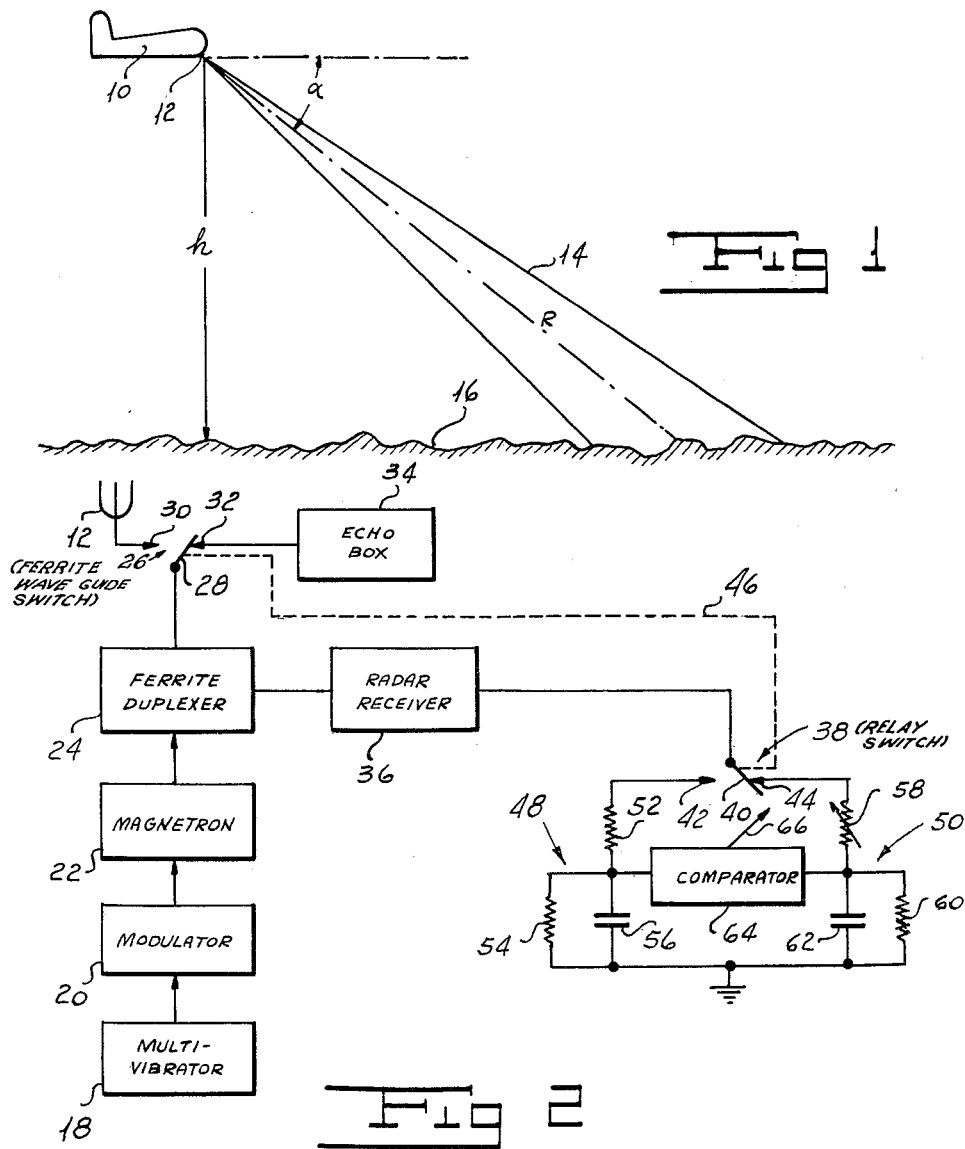
INVENTOR.
WILLIAM W. FENN
BY
ATTORNEY United States Patent Office 3,071,766
Patented Jan. 1, 1963

3,071,766
RADAR ALTITUDE CONTROL
William W. Fenn, Greenwich, Conn., assignor to United Aircraft Corporation, East Hartford, Conn., a corporation of Delaware
Filed Aug. 27, 1958, Ser. No. 757,484
6 Claims. (Cl. 343—13)

My invention relates to a radar altitude control and more particularly to an improved radar altitude control which is more accurate than radar altitude controls of the prior art and which responds to the attitude of the aircraft as well as to the altitude of the aircraft.

Radar systems are known in the prior art which measure the time interval between the transmission of energy and the reception of the reflected energy to indicate the altitude of an aircraft. These systems are completely insensitive to the angle at which the radiation strikes the surface from which it is reflected and the distance signal does not provide any indication of the slope of the terrain. A system can be provided in which the reflected power is compared with an arbitrary power standard to obtain the altitude indication. Such a system responds to the angle of incidence of radiation on the reflecting surface and will provide an indication of the slope of terrain. Such a system must be calibrated by measuring received radiation against the arbitrary standard at various known altitudes. It will be apparent that the received power compared with the power standard in this system is a function not only of the aircraft altitude but also of the transmitter magnetron power and the receiver sensitivity. Once the system has been calibrated, it will not account for variations in the power compared with the standard resulting from changes in the transmitter power and from variation in the receiver sensitivity. For this reason, false and inaccurate indications of altitude are likely to be given by a system of this type.

The radar altitude systems of the prior art embody the further defect that they fail to afford any true indication of the attitude of the aircraft if responsive to altitude and fail to give a true indication of altitude if sensitive to attitude.

I have invented a radar altitude control system which is more accurate than are radar altitude control systems of the prior art. Altitude indications and control signals in my system are independent of the transmitter power and of receiver sensitivity. My radar altitude control responds not only to the altitude of the aircraft, but also to the attitude of the aircraft.

One object of my invention is to provide a radar altitude control system which is more accurate than are radar altitude control systems of the prior art.

Another object of my invention is to provide a radar altitude control for producing control signals which are independent of the transmitter power and of the receiver sensitivity.

A further object of my invention is to provide a radar altitude control system which responds not only to the altitude of the aircraft, but also to the attitude of the aircraft.

Other and further objects of my invention will appear from the following description.

In general my invention contemplates the provision of a radar altitude control system including an antenna mounted on the aircraft at a constant forward depression angle, which angle is appreciably greater than zero degrees but appreciably less than ninety degrees; as, for example thirty degrees, forty-five degrees or sixty degrees. My system includes a radar transmitter, a radar receiver, a duplexer adapted alternately to receive energy from the transmitter and to feed energy to the receiver and a wave guide switch and relay switch actuated in unison. In a first position of the switches the wave guide switch connects the duplexer to an echo box and the relay switch connects the receiver to a first leaky integrating circuit. In this condition of the system a transmitter pulse is fed to the echo box, which stores the pulse energy and returns it to the first integrating circuit through the receiver. In the second position of the switches the wave guide switch connects the duplexer to the antenna and the relay switch connects the receiver to a second leaky integrating circuit. In this second condition of the system a pulse transmitted from the antenna is reflected from the target area and is fed back through the receiver to the second integrating circuit. A comparator compares the energies in the respective integrating circuits to produce an output signal which is the desired altitude control signal.

In the accompanying drawings which form part of the instant specification and which are to be read in conjunction therewith and in which like reference numerals are used to indicate like parts in the various views:

FIGURE 1 is a diagrammatic view of an aircraft provided with my radar altitude control system with the aircraft shown in flight.

FIGURE 2 is a block diagram of my radar altitude control system with parts shown schematically.

Referring now to FIGURE 1 of the drawings, an aircraft 10 provided with my radar control system has an antenna 12 which directs a radar beam 14 outline in solid lines in FIGURE 1 toward the terrain 16, being approached by the aircraft. I mount the antenna 12 on the aircraft 10 at a fixed depression angle $\alpha$ with respect to a fixed longitudinal reference line in the aircraft. With this fixed depression angle $\alpha$ it will readily be appreciated that the altitude $h$ of the aircraft is at all times proportional to the slant range R. As is well known in the art, the power returned to a radar system varies inversely as a function of the range. The ratio of transmitted power to received power is a measure of the slant range R. With a constant depression angle $\alpha$ the ratio of transmitted to received power also affords a measure of aircraft altitude.

Referring now to FIGURE 2, my radar altitude control system includes a multivibrator 18, the output pulses of which I apply to a modulator 20. Modulator 20 supplies the input signal for a magnetron circuit 22 which provides the transmitted pulses of my system. It will be understood that the multivibrator 18, the modulator 20, and the magnetron 22 form the radar transmitter of my system. A transmit-receive device 24, which may be of any suitable type known in the art which has a recovery time consistent with the minimum range requirements of the system is adapted to couple the output pulses from magnetron 22 to a wave guide switch indicated generally by the reference character 26. The wave guide switch 26 may be any suitable type of wave guide switch known to the art. Preferably, I employ a ferrite wave guide switch such, for example as that shown and described in Patent No. 2,809,354, issued October 8, 1957, to P. J. Allen for an Electronic Microwave Switch.

For the purpose of clarity in exposition, I have indicated the wave guide switch 26 as including a contact arm 28 adapted to be actuated alternatively to engage a contact 30 connected to the antenna 12 and to engage a contact 32 connected to an echo box 34 of any suitable type known to the art. From the foregoing description, it will be seen that with switch 26 in its condition at which arm 28 engages contact 30 duplexer 24 and the switch 26 pass transmitted pulses to the antenna 12. With switch 26 in its condition at which arm 28 engages contact 32 duplexer 24 and the switch 26 pass transmitted pulses to the echo box 34.

My system includes a radar receiver 36 of a suitable type known to the art. I connect the receiver 36 to receive pulses from duplexer 24 and to pass its output pulses to a relay switch indicated generally by the reference character 38. Switch 38 includes a contact arm 40 adapted to be actuated alternatively to engage a contact 42 and to engage a contact 44. In my radar altitude control system I operate switches 26 and 38 in unison, in a manner known to the art, to cause arms 28 and 40 to engage contacts 32 and 44 in one condition and to engage contacts 30 and 42 in the other condition. For simplicity I have indicated this operation as a mechanical linkage 46 which gangs the arms 28 and 40.

I connect the respective contacts 42 and 44 to respective integrating networks indicated generally by the respective reference characters 48 and 50. Circuit 48 includes a resistor 52 connected between terminal 42 and a common terminal of a leakage resistor 54 and a capacitor 56 connected in parallel between resistor 52 and ground. The circuit 50 includes a variable resistor 58 connected between contact 44 and the common terminal of a leakage resistor 60 and a capacitor 68 connected in parallel between resistor 58 and ground.

From the circuitry thus far described, it will be apparent that with switch 38 in its condition at which arm 40 engages contact 42 the receiver output signal passes to circuit 48 which integrates the signal. Similarly, with switch 38 in its condition at which arm 40 engages contact 44, the receiver output signal passes to circuit 50 which integrates this signal. It will be appreciated that the potential across circuit 48 is a measure of received power while the potential across circuit 50 is a measure of transmitted power. Where the potentials across the respective circuits 48 and 50 differ, an error signal appears between the common terminal of resistor 52 and circuit 48 and the common terminal of resistor 58 and circuit 50. I connect a comparator 64 between the common terminal of resistor 52 and circuit 48 and the common terminal of resistor 58 and circuit 50 to be responsive to the error signal. Comparator 64 may be of the nature of an amplifier which amplifies the error signal to produce a control signal on its output channel 66. With the system in operation and with resistor 58 set to a value corresponding to a desired altitude the system produces an error signal representing the deviation of the aircraft from the desired altitude. Comparator 64 amplifies this signal and feeds it to a control servomotor (not shown) or the like to cause the aircraft to approach the desired altitude. When the aircraft is at an altitude corresponding to the altitude for which resistor 58 is set the error signal is zero.

In operation of my radar altitude control system with switches 26 and 38 in the first positions at which arms 28 and 40 engage contacts 32 and 44, the duplexer 24 sends a transmitted pulse through switch 26 to the echo box 34. As is known in the art, the energy of the pulse causes damped oscillations to occur in echo box 34 which are then coupled back out of it. The return energy passes through duplexer 24 and through the receiver 36 and switch 38 to integrating circuit 50 which builds up an energy store which provides a measure of transmitted power.

With the switches 26 and 38 in their second conditions at which arms 28 and 40 engage contacts 30 and 42 duplexer 24 passes a transmitted pulse to the antenna 12. This pulse is reflected from the terrain 16 and passes back through switch 26 and duplexer 24 to the receiver 36. The receiver output signal flows through switch 38 to the integrating circuit 48 which builds up a store of energy providing a measure of the reflected power. Comparator 64 determines the difference between the energies stored in the respective integrating circuits 48 and 50 to produce a control signal on channel 66 which represents the deviation of the aircraft from its preset altitude. It will be obvious that as the aircraft 10 rises, the returned power decreases and that as the aircraft falls, returned power increases.

In use of my radar altitude control the comparator reference level is set to a value corresponding to the desired altitude. When the aircraft reaches this altitude, the signal representing the difference between the energies stored in the respective integrating circuits equals the preset level, the error signal is zero and the control channel 66 carries no output command signal. When the aircraft drops below the altitude corresponding to the preset altitude, the received power increases and the signal representing the difference between returned power and transmitted power decreases to cause comparator 64 to produce a command output signal which is in a direction to cause the aircraft to rise. When the aircraft rises above the preset altitude, the returned power decreases and the difference signal increases to cause the comparator to produce an output signal which actuates the altitude control mechanism (not shown) to cause the aircraft to dive.

My altitude control system responds to the aircraft attitude as well as to the aircraft altitude. A command signal to increase altitude over relatively flat terrain is analogous to an increase in received power and causes the aircraft to climb. As the nose of the aircraft points up in response to this signal the received power automatically decreases. This action prevents the aircraft from overshooting the new altitude as it approaches this altitude from below. Similarly, as soon as the aircraft nose points downwardly in response to a signal analogous to a decrease in received power from that which corresponds to the initial altitude, the received power immediately increases.

My system also provides advance warning of large obstructions in the path of flight of the aircraft. As a large obstacle is approached, a command signal is generated to cause the aircraft to rise. If the aircraft were passing over relatively smooth terrain including no steep obstacles, as soon as the nose of the aircraft pointed upwardly in response to such a signal, received power would immediately decrease causing the aircraft to tend to level off. When a large obstruction is approached, however, as the nose of the aircraft moves upwardly, the returned power increases rather than decreases, thus increasing the steepness of the climb. In this manner, my radar altitude control system automatically avoids large obstructions in the path of the aircraft.

It will be seen that I have accomplished the objects of my invention. I have provided a radar altitude control which is more accurate than radar altitude systems of the prior art. My system produces indications which are independent of the transmitter power and of the receiver sensitivity. My system responds not only to the altitude of the aircraft, but also to the aircraft attitude. My system is arranged to give advanced warning of large obstructions in the path of the aircraft.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A radar altitude control system for an aircraft including in combination an antenna, means mounting the antenna on the aircraft, a radar transmitter, a radar receiver, an echo box, first energy-storing means, second energy-storing means, first means for alternately coupling said transmitter to said antenna and to said echo box, second means for alternately coupling said receiver to said first and to said second energy-storing means, means for actuating said first and second coupling means in unison alternately to first conditions at which said transmitter applies a pulse to said echo box and at which said echo box transfers energy stored from said transmitted pulse through said receiver to said first energy-storing means and to second conditions at which said transmitter feeds a pulse to said antenna and at which a reflected pulse is fed through said receiver to said second energy-storing means and means for comparing the energies stored by said energy-storing means.

2. A system as in claim 1 in which said first and second energy-storing means are leaky integrating circuits.

3. A system as in claim 1 in which transmitter includes a duplexer adapted alternately to couple energy in one direction from said transmitter to said first coupling means and to couple energy in the other direction from said first coupling means to said receiver.

4. A system as in claim 1 in which said first coupling means is a ferrite waveguide switch and in which said second coupling means is a relay switch.

5. A radar altitude control system for an aircraft including in combination an antenna, means mounting the antenna on the aircraft at a constant forward depression angle which is appreciably greater than zero degrees and appreciably less than ninety degrees, means for transmitting radar pulses from the antenna, and means responsive to the magnitude of the reflected signal received by the antenna for generating an altitude control signal independently of the time interval between the transmission of a pulse and the reception of that pulse.

6. A radar altitude control system for an aircraft including in combination an antenna, means mounting the antenna at a constant forward depression angle which is generally greater than zero degrees and appreciably less than ninety degrees, a radar transmitter, a radar receiver, an echo box, first energy-storing means, second energy-storing means, first means for alternately coupling said transmitter to said antenna and to said echo box, second means for alternately coupling said receiver to said first and to said second energy-storing means, means for actuating said first and second coupling means in unison alternately to first conditions at which said transmitter applies a pulse to said echo box and at which said echo box transfers energy stored from said transmitted pulse through said receiver to said first energy-storing means and to second conditions at which said transmitter feeds a pulse to said antenna and at which a reflected pulse is fed through said receiver to said second energy-storing means and means for comparing the energies stored by said energy-storing means.

References Cited in the file of this patent

UNITED STATES PATENTS

| | | |
|---|---|---|
| 1,854,122 | Eaton | Apr. 12, 1932 |
| 1,987,587 | Drake | Jan. 8, 1935 |
| 2,011,392 | Bentley | Aug. 13, 1935 |
| 2,225,046 | Hunter | Dec. 17, 1940 |
| 2,227,598 | Lyman et al. | Jan. 7, 1941 |
| 2,574,853 | Ward | Nov. 13, 1951 |
| 2,822,536 | Sandretto | Feb. 4, 1958 |

OTHER REFERENCES

"Radar System Engineering" (Ridenour), published by McGraw-Hill; New York, 1947, pp. 58–62 relied upon.

"Radar Primer" (Hornung), published by McGraw-Hill; New York, 1948, pp. 16–19 relied upon.